(12) United States Patent
Pang

(10) Patent No.: US 9,545,962 B2
(45) Date of Patent: Jan. 17, 2017

(54) INFLATABLE ELECTRIC VEHICLE

(71) Applicant: Yi Pang, Olney, MD (US)

(72) Inventor: Yi Pang, Olney, MD (US)

( * ) Notice: Subject to any disclaimer, the term of this patent is extended or adjusted under 35 U.S.C. 154(b) by 2 days.

(21) Appl. No.: 15/001,223

(22) Filed: Jan. 19, 2016

(65) Prior Publication Data
US 2016/0207577 A1 Jul. 21, 2016

Related U.S. Application Data

(60) Provisional application No. 62/105,266, filed on Jan. 20, 2015.

(51) Int. Cl.
| | | |
|---|---|---|
| B60K 1/04 | (2006.01) |
| B62D 39/00 | (2006.01) |
| B60R 21/23 | (2006.01) |
| B62D 21/11 | (2006.01) |
| B60L 11/18 | (2006.01) |
| B60K 26/02 | (2006.01) |
| B62D 21/14 | (2006.01) |
| B60R 21/26 | (2011.01) |

(Continued)

(52) U.S. Cl.
CPC .............. *B62D 39/00* (2013.01); *B60G 3/20* (2013.01); *B60G 11/27* (2013.01); *B60K 1/04* (2013.01); *B60K 26/02* (2013.01); *B60L 11/1851* (2013.01); *B60R 21/0136* (2013.01); *B60R 21/23* (2013.01); *B60R 21/26* (2013.01); *B62D 21/11* (2013.01); *B62D 21/14* (2013.01); *B60G 2200/144* (2013.01); *B60G 2202/152* (2013.01); *B60G 2202/242* (2013.01); *B60G 2300/50* (2013.01); *B60K 2001/0405* (2013.01); *B60K 2026/029* (2013.01); *B60R 2021/0004* (2013.01); *B60R 2021/26094* (2013.01)

(58) Field of Classification Search
CPC ............. A63H 30/00–30/04; B60K 1/00–1/04; B60K 2001/001–2001/0494; B60K 2007/003–2007/0092; B60K 7/00–7/0023; B60R 2021/0002–2021/0025; B60R 2021/0072; B60R 2021/0086; B60R 2021/0097
See application file for complete search history.

(56) References Cited

U.S. PATENT DOCUMENTS

| | | |
|---|---|---|
| 4,126,312 A | 11/1978 | Kreuzer et al. |
| 4,821,829 A | 4/1989 | Gilbert et al. |

(Continued)

*Primary Examiner* — Erez Gurari
(74) *Attorney, Agent, or Firm* — Louis Ventre, Jr.

(57) ABSTRACT

An electric vehicle for personal transportation includes an inflatable body that is airtight and a chassis. The chassis is made of two box-like structures connected together with a hinge so that when rotated together around the hinge the two box-like structures form an enclosure configured to hold the inflatable body when the inflatable body is deflated. The inflatable body preferably holds a number of independent "air bags" or chambers formed in the shape of an automobile and includes a driver's compartment with a driver's seat. A front-end chamber of the electric vehicle inflates a collision air-bag through a flowable connection when the front-end chamber is impacted in a front-end collision. A suspension system may be present for each wheel. The suspension system includes an arm between two tubular bearings. The arm is made of an air-chamber bag partially contained by a sheet-metal cap providing rigidity.

16 Claims, 7 Drawing Sheets

(51) Int. Cl.
  *B60G 11/27*   (2006.01)
  *B60G 3/20*    (2006.01)
  *B60R 21/0136* (2006.01)
  B60R 21/00     (2006.01)

(56) References Cited

U.S. PATENT DOCUMENTS

| | | |
|---|---|---|
| 5,512,002 A | 4/1996 | Lieberman |
| 6,659,837 B1 | 12/2003 | Lieberman |
| 7,188,694 B1 | 3/2007 | Blair |
| 7,214,119 B2 | 5/2007 | Lucas et al. |
| 7,621,358 B2 | 11/2009 | Pang |
| 7,926,606 B2 | 4/2011 | Wang |
| 8,627,910 B1 | 1/2014 | Carque |
| 9,216,776 B2 | 12/2015 | Suh et al. |
| 2002/0056409 A1* | 5/2002 | Murphree ................ B63B 1/18 114/345 |
| 2008/0153382 A1 | 6/2008 | Borg et al. |
| 2009/0043438 A1 | 2/2009 | Redmond |

* cited by examiner

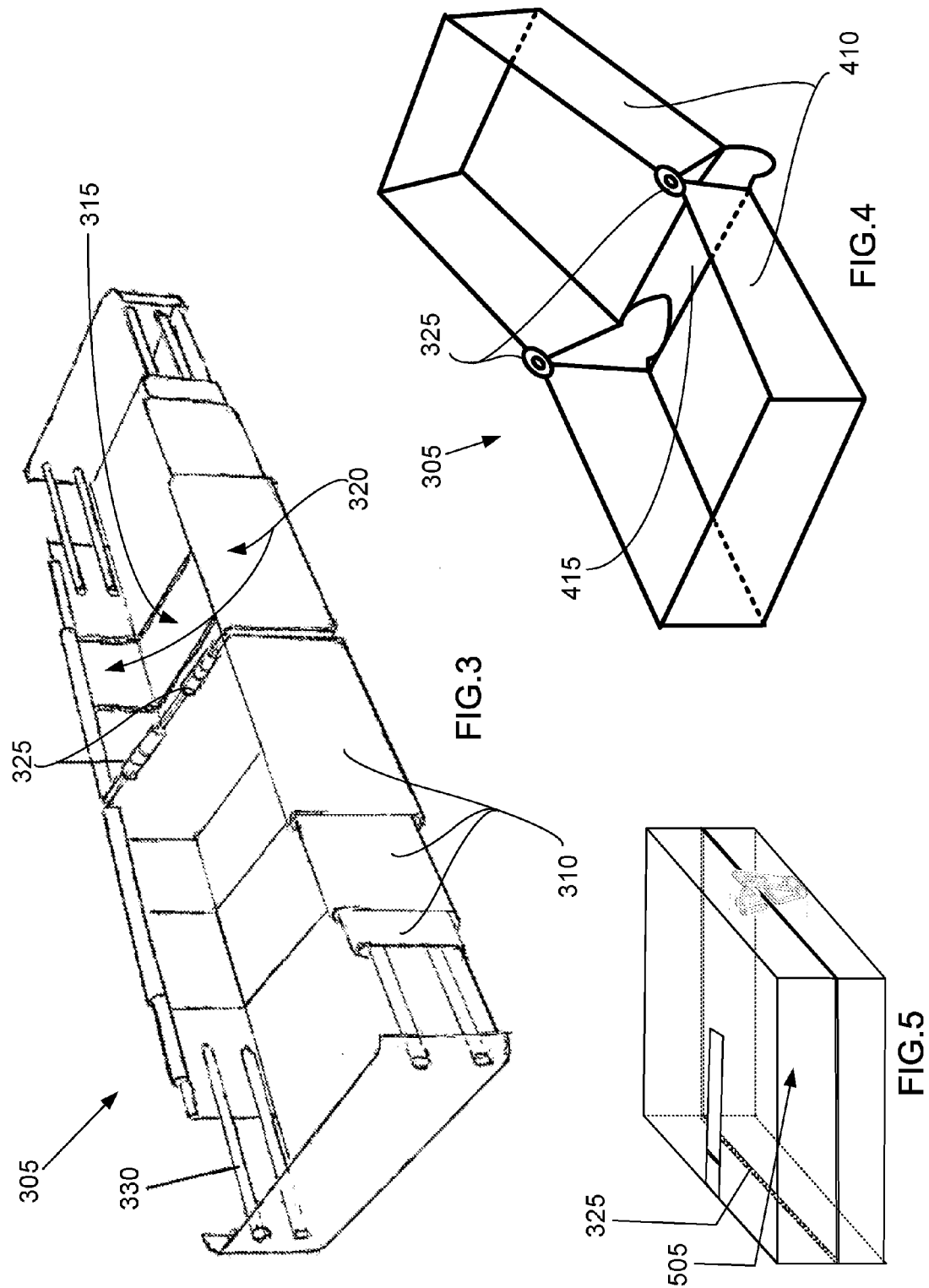

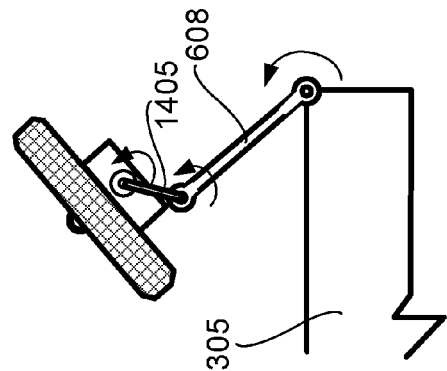
FIG.14
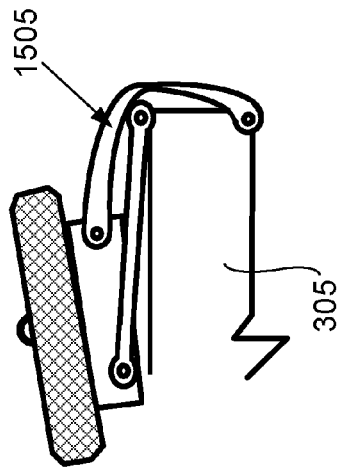
FIG.15
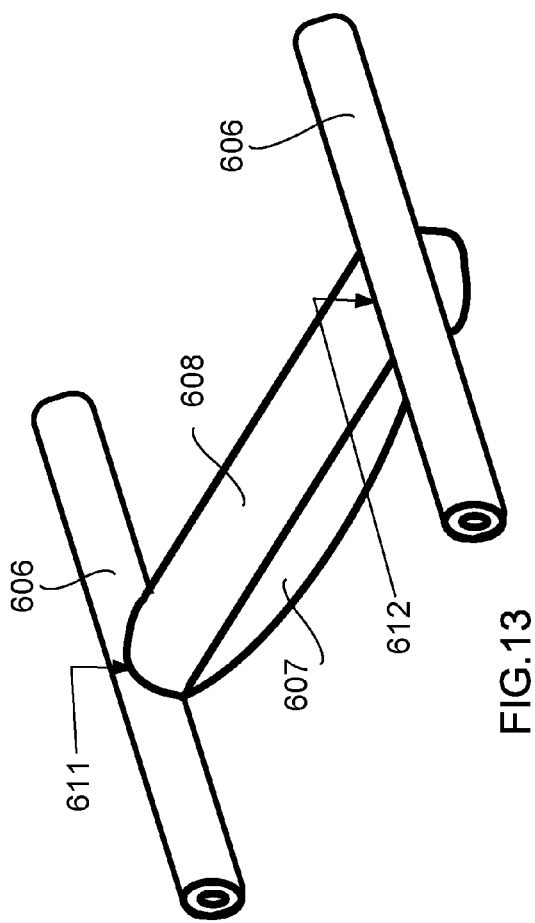
FIG.13
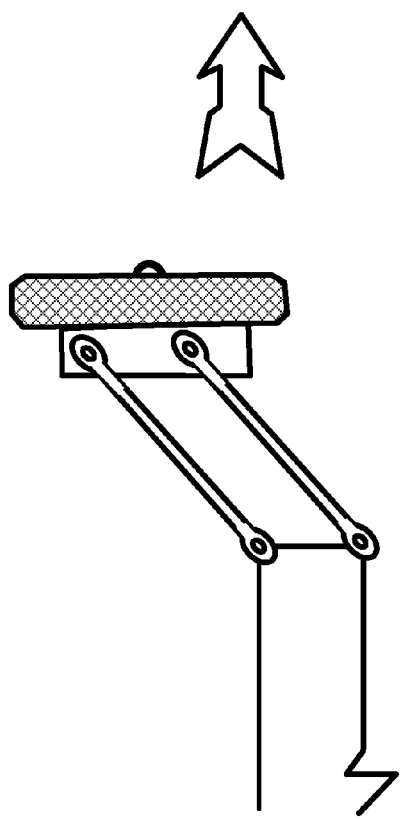

INFLATABLE ELECTRIC VEHICLE

CROSS-REFERENCE TO RELATED APPLICATIONS

This application claims the benefit of U.S. Provisional Application No. 62/105,266, filed 20 Jan. 2015, which is hereby incorporated by reference herein.

TECHNICAL FIELD

In the field of motor vehicles, an electric vehicle for personal transportation has an inflatable body that may be deflated and the vehicle collapsed to a boxed storage and transport configuration.

BACKGROUND ART

The invention is an outgrowth of a basic inflatable electric vehicle described in U.S. Pat. No. 7,621,358. This application adds several unique improvements to it to make it fully functional and feature rich.

SUMMARY OF INVENTION

An electric vehicle for personal transportation includes an inflatable body that is airtight and a chassis. The chassis is made of two box-like structures connected together with a hinge so that when rotated together around the hinge the two box-like structures form an enclosure configured to hold the inflatable body when the inflatable body is deflated.

The inflatable body preferably holds a number of independent "air bags" or chambers formed in the shape of an automobile and includes a driver's compartment with a driver's seat. The chambers preferably form one or more vehicle access doors that open when deflated and close when inflated. A collision air-bag may be positioned in front of the driver's seat. A front-end chamber of the electric vehicle inflates the collision air-bag through a flowable connection when the front-end chamber is impacted in a front-end collision.

The electric vehicle preferably includes a suspension system for each wheel. The suspension system includes an arm between two tubular bearings. The arm is made of an air-chamber bag partially contained by a sheet-metal cap providing rigidity. The suspension system also preferably includes an air-spring made of a sealed bellows connected to a compressed air supply and an air-damper made of a bellows with an opening or vent hole. The vent hole allows air to move in and out of the bellows so that road shocks to the wheels are cushioned by the air spring and damper combination. The vent hole in the damper may connect to atmosphere, but preferably to a chamber making up one of the fenders and thus connecting to a source of compressed air to provide additional support.

A battery pack is preferably provided for each wheel located between each sheet-metal cap of the suspension system and the inflatable body.

An inflation control system is preferably provided that includes an electronic control unit; an air pump electrically connected to the electronic control unit; a plurality of electromagnetic valves connected to the inflatable body and to each chamber in the plurality of chambers; and an air-pressure sensor connected to the electronic control unit. Each chamber preferably contains an air-pressure sensor. The electronic control unit turns on the air pump and opens each of the electromagnetic valves to allow the air pump to pressurize the inflatable body or any of the plurality of chambers to a desired pressure measured by the air-pressure sensor.

A computer control system may be used to operate the vehicle using a joystick and it may be wired or wireless.

Technical Problem

Ordinary personal vehicles (automobiles or cars) are bulky and heavy. This may not be a problem for an automobile powered by fuel because gas stations are widely available. But for an electric vehicle where charging facilities are not readily available, a bulky and heavy vehicle poses limits the availability to electrical plugs for charging the vehicle. For example, people living in apartment or in an environment where a charging facility is not widely available could avoid such obstacles if there were an electric vehicle capable of being deflated, taken indoors and plugged into an electrical socket in a secure location.

An inflatable electric vehicle needs to maximize the use of relatively light-weight inflatable bags or chambers so that it can be deflated and packaged away in a box formed by its own chassis, for both protection from damage and easy carriage.

An inflatable electric vehicle would be better having redundancy in air containment to ensure that a leak in any of the inflatable bags or chambers does not disable the vehicle.

An inflatable electric vehicle would be better if it had driver protection from an accident or head-on collision where the mechanisms for such protection are structured using the inflatable bags or chambers.

An inflatable electric vehicle would be better having functional inflatable doors that open and close with deflation and inflation. Such door structures enable access to the driver's compartment and also add protection for the driver from side impact injuries.

An inflatable electric vehicle would be better having inflatable chambers that permit adjustment of the driver's seat, wheel and pedal controls.

An inflatable electric vehicle would be better having one or more access doors and a retractable roof that are openable and closable by deflating and inflating one or more chambers.

An inflatable electric vehicle would be better having an aerodynamic shape that adds the look and feel of a regular automobile, yet delivers road stability with a downward force on the tires.

An inflatable electric vehicle would be better having a suspension system that is formed using chambers filled with air and cushions shocks by air flow through a bellows.

Solution to Problem

The solution to some or all of the problems identified above is the inflatable electric vehicle in one or more embodiments described herein.

Advantageous Effects of Invention

The chassis of the inflatable electric vehicle disclosed herein can enclose the entire deflated body (and optionally the wheels, suspension and everything) when the box-like structures from which it is made are folded to the closed position. This design feature makes the vehicle portable, small enough to be carried into an apartment of a high rise building to be charged. In many places in the United States and other countries, obstacles to greater electric vehicle use are access a charging facility and finding a parking space. If the electric vehicle is made small enough, it may conceivably be carried into public transportation (airplane, high-speed train, etc.), especially if the batteries are packaged separately. This feature would make business travel a lot easier.

The inflatable electric vehicle disclosed herein offers advantageous effects by providing redundancy to preserve inflation status. If the inflatable body or any chamber in the plurality of chambers leaks or breaks, the vehicle body still stands.

A second advantageous effect is the enhancement of safety and driver protection. The chambers surrounding the driver provide collision protection from all directions. The front chamber at the nose of the electric vehicle is preferably designed to inflate the driver's-air-bag without an explosive charge like the ones in conventional cars. Thus, there is no chance of metal fragments injuring the driver. The mechanism in the present invention is driver's air bag deployment in front of the driver when the chamber at the front of the vehicle is squeezed by a collision.

A third advantageous effect is the provision of one or more inflatable doors. For example, one or both sides of the electric vehicle may be fitted with doors, each formed by one or more chambers. The rear of the electric vehicle may also be fitted with a trunk door formed by a chamber. Two side chambers could be "doors" of the vehicle. One option for opening and closing a door is to deflate or inflate a side chamber, respectively. Thus, when deflated, the door lowers to enable egress from the driver's seat; and when inflated, the door rises and closes in the driver's compartment. When closed, the door provides side-impact collision protection.

A fourth advantageous effect is the enabling of repositioning of the driver's seat (115) and steering wheel using air-filled bags (chambers). The height of the seat may be adjusted by changing the pressure of its air cushion, and the tilting of a seat backrest may be adjusted by using supporting chamber rods (stiffening members). The steering wheel may be adjustable in a similar fashion. Both acceleration and brake pedals might also be movable, which would thereby permit adjustments to accommodate each individual driver.

A fifth advantageous effect is the potential to provide a functioning convertible vehicle roof, which might be made retractable by inflating or deflating a roof-top air chamber connected to reserve air in a chamber in the trunk or rear of the electric vehicle.

A sixth advantageous effect is the potential to provide streamlining. For example, a sheet of fabric may cover several air bags to smooth out any wrinkles at the borders between multiple inflated chambers. This sheet, with the chambers it connects, preferably forms a sealed space and is pressurized when in use. The inflatable body incorporates multiple inflated chambers and is preferably sculpted to a shape that is aerodynamically streamlined. Preferably, the shape of the electric vehicle creates a down-force when the vehicle moves at high speed, and resists or reduces the effect of any side wind.

A seventh advantageous effect is the potential to support an independent suspension. For example, each of the 4 wheels preferably has at least a pair of "air bags" to act as spring and damping element or air-damper. The "spring" element is preferably the bellow, formed with a sealed bellow-shaped air chamber. The air-damper is preferably formed with a bellow, defining a vent hole to another larger air chamber or "air reservoir" in a fender.

BRIEF DESCRIPTION OF DRAWINGS

The drawings illustrate preferred embodiments of the inflatable electric vehicle according to the disclosure. The reference numbers in the drawings are used consistently throughout. New reference numbers in FIG. 2 are given the 200 series numbers. Similarly, new reference numbers in each succeeding drawing are given a corresponding series number beginning with the figure number.

FIG. 3 is a perspective view of a preferred embodiment of a chassis, also described as the lower portion, of the inflatable electric vehicle.

FIG. 4 is a perspective view of a second preferred embodiment of the chassis, also described as the lower portion, of the inflatable electric vehicle.

FIG. 5 is a perspective view of a third preferred embodiment of the chassis in a folded closed position.

FIG. 13 is a perspective of the first arm composed of a first sheet-metal cap and a first air-chamber bag, the first arm connected to two bearings in the suspension system.

FIG. 14 is a front elevation view of the first arm in rotation around three axis of rotation to a storage position within the chassis.

FIG. 15 is a front elevation view of a first arm and a second arm partly rotated to the storage position within the chassis and illustrating the bent configuration of the second arm.

DESCRIPTION OF EMBODIMENTS

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and, therefore, other embodiments may be utilized and structural, and operational changes may be made, without departing from the scope of the present invention.

Figures 1, 2:
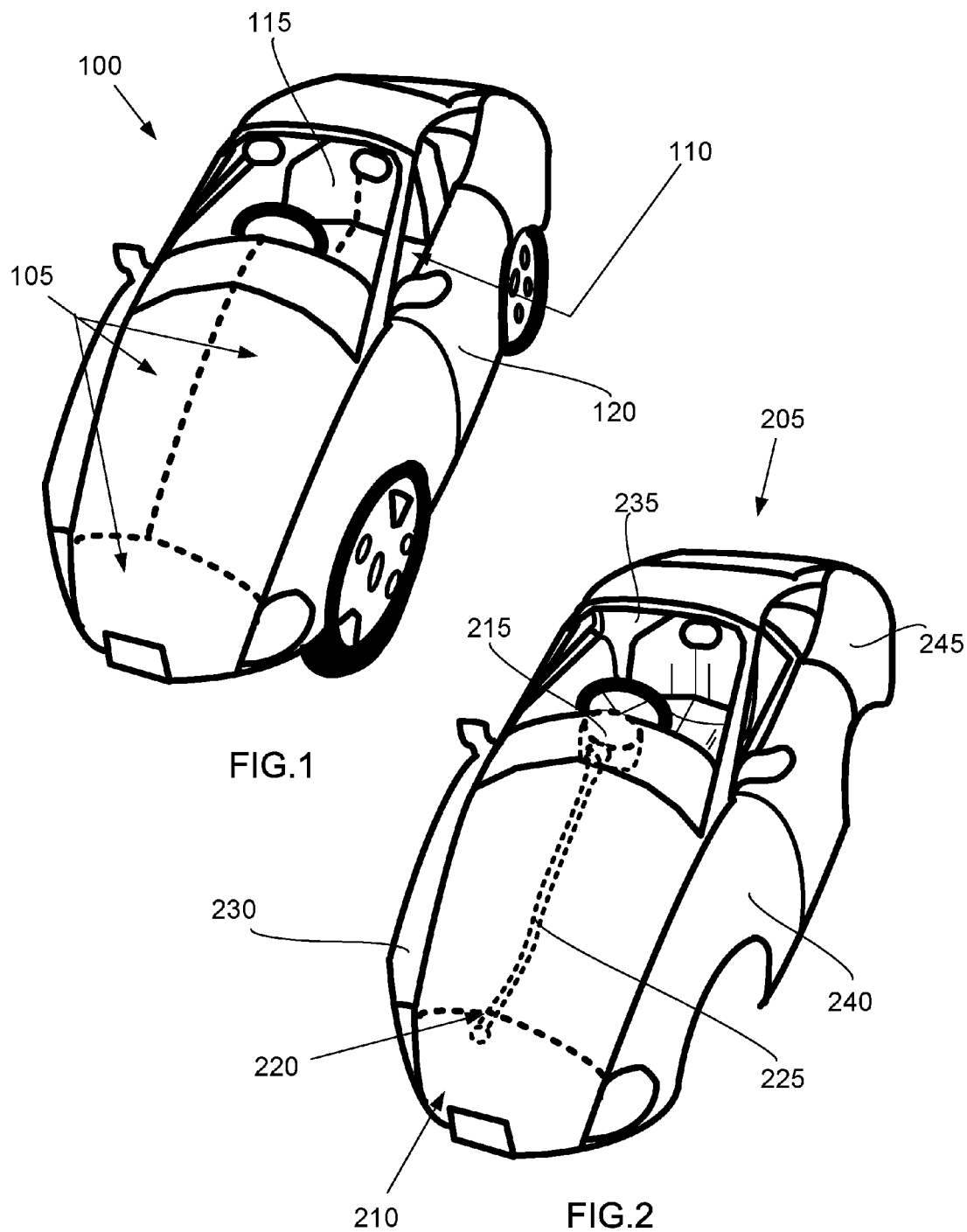
FIG. 1 is a perspective view of a preferred embodiment of the inflatable electric vehicle.
FIG. 2 is a perspective view of a preferred embodiment of the inflatable body, also described as the upper portion, of the embodiment in FIG. 1.

A preferred embodiment of an electric vehicle (100) for personal transportation is shown in a perspective view of the inflatable electric vehicle in FIG. 1. The electric vehicle (100) includes an inflatable body (205); and a chassis (305)

that doubles as a box-like container holding the inflatable body (205) when it is deflated.

The inflatable body (205) is airtight: it is a self-contained air bag. The inflatable body is preferably in the shape of a traditional automobile.

In preferred embodiments, the inflatable body (205) also includes a plurality of chambers (105), which are also self-contained air bags. When present, the plurality of chambers (105) is shaped to define structural components selected from group consisting of a driver's compartment (110) for the electric vehicle, a driver's seat (115) within the driver's compartment (110); a right-side-front-fender (230), a right-side-rear-fender (235), a left-side-front-fender (240), a left-side-rear-fender (245), a rooftop (125), and a driver's-air-bag (215) positioned in front of the driver's seat (115).

The inflatable body (205) and each chamber in the plurality of chambers (105) is preferably made of fabric-reinforced, flexible polymer sheet, but may be made of any lightweight and flexible material that can hold pressured air. For embodiments with the plurality of chambers (105), each such chamber is positioned within the inflatable body (205) to help shape the inflatable body (205) into a traditional auto body shape. Each chamber in the plurality of chambers (105) is an independent airtight container that offers advantageous effects described above.

When present, the plurality of chambers (105) is contained within the inflatable body (205), so that effectively there is an outer bag (the inflatable body (205) and a plurality of inner bags (the plurality of chambers (105). The dotted lines in FIG. 1 indicate that chambers are under a "skin" sheet of the inflatable body (205), so that the inflatable body (205) covers up any wrinkles at the borders between air bags.

In preferred embodiments, the inflatable body (205) includes a front-end (210) in the manner of traditional automobiles. In such embodiments, the driver's-air-bag (215), like those in a traditional automobile, is positioned in front of the driver's seat (115), for example, in the dash or within a steering wheel.

In preferred embodiments, the plurality of chambers (105) includes a front-chamber (220). The front-chamber (220) is positioned at the front-end (210) of the inflatable body (205). The front-chamber (220) is configured to inflate the driver's-air-bag (215) through a flowable connection (225) when the front-chamber (220) is impacted in a front-end (210) collision. The front-chamber (220) thus serves as a reservoir of pressurized air for the driver's-air-bag (215).

The plurality of chambers (105) preferably includes a left-side-door-chamber (120). The left-side-door-chamber (120) opens to permit access to the driver's seat (115) when it is deflated and closes to hold the driver within when it is inflated. A door on each side would enable entrance and exit for either side of the electric vehicle. In addition to doors, middle parts of the electric vehicle (100), which include a floor within the driver's compartment (110), a driver's seat (115), a driver's compartment roof, which might be made retractable by deflation, and a rear trunk, may be made with a chamber. Two or more chambers may be used if redundancy is sought.

In preferred embodiments, the electric vehicle (100) includes an inflatable body (205) that has an inside surface (1115) and an outside surface (1110), wherein the outside surface (1110) is covered by a plurality of scales (1010) that are independently-affixed to the outside surface (1110).

The outside surface (1110) is the skin of the electric vehicle (100). The outside surface (1110) is the exterior surface of the inflatable body (205) and as indicated this outside surface (1110) may be covered with scales (1010), which are preferably made of hard substance such as glass or ceramic. The scales (1010) improve the wear and resist puncture or cuts to the inflatable body (205). Each of the scales (1010) is preferably attached at a connecting point (1015) that is small in comparison to each scale so as to enable each scale to flexibly lie flat on the surface of the inflatable body (205) yet not inhibit folding once deflated. The scales (1010), in concept, are somewhat like the scales on a fish or a dinosaur or medieval chain maille, except that in this case, the scales (1010) are attached so as to provide a shield against damage yet enable movement, folding and storage.

The chassis (305) is the undercarriage of the electric vehicle (100) and is preferably made from an opened hard-shell case, which is essentially a box, which becomes a carrying case of the electric vehicle (100) when it is fully deflated, folded and stored in a closed hard-shell case.

Preferably, the chassis (305) includes two box-like structures (410). The term box-like structure is defined loosely to include a U-shaped structure of a floor and two walls or a partial box with a floor, three or four vertical walls and no top wall. When the two box-like structures (410) are folded together, the combination as shown in FIG. 5 forms a closed box. Thus, each of the two box-like structures (410) includes a floor (315) connecting at least 2 walls (320) rising from the floor (315). The two box-like structures (410) are connected together with one or more hinges (325) so that when rotated together around said one or more hinges (325), the two box-like structures (410) form an enclosure (505) configured to hold the inflatable body (205) when the inflatable body (205) is deflated. As shown in FIG. 5, the box-like structures (410) may optionally be hinged together at the top edge, so that when they are opened, there is no "wall" at the connection of the two. A soft fabric (415) connecting the bottom edges below the hinges may be used to enclose that end.

With sufficient length provided by the chassis, an additional seat, i.e. a passenger seat, may be made available behind the driver's seat (115).

The electric vehicle (100) may have a chassis (305) wherein one or two of the two box-like structures (410) comprises a plurality of telescoping sections (310) that slide together to shorten the chassis (305) and that slide apart to lengthen the chassis (305). Such a feature would support adding the passenger seat or changing the volume available for storage of the inflatable body (205) when the inflatable body (205) is deflated. Preferably, there is a latch or other securing mechanism underneath each of the box-like structures (410) to hold them together and maintain the open position of both halves of the chassis (305). There is also a latch to hold the box-like structures (410) closed when needed to store the inflatable body (205).

Figure 7:
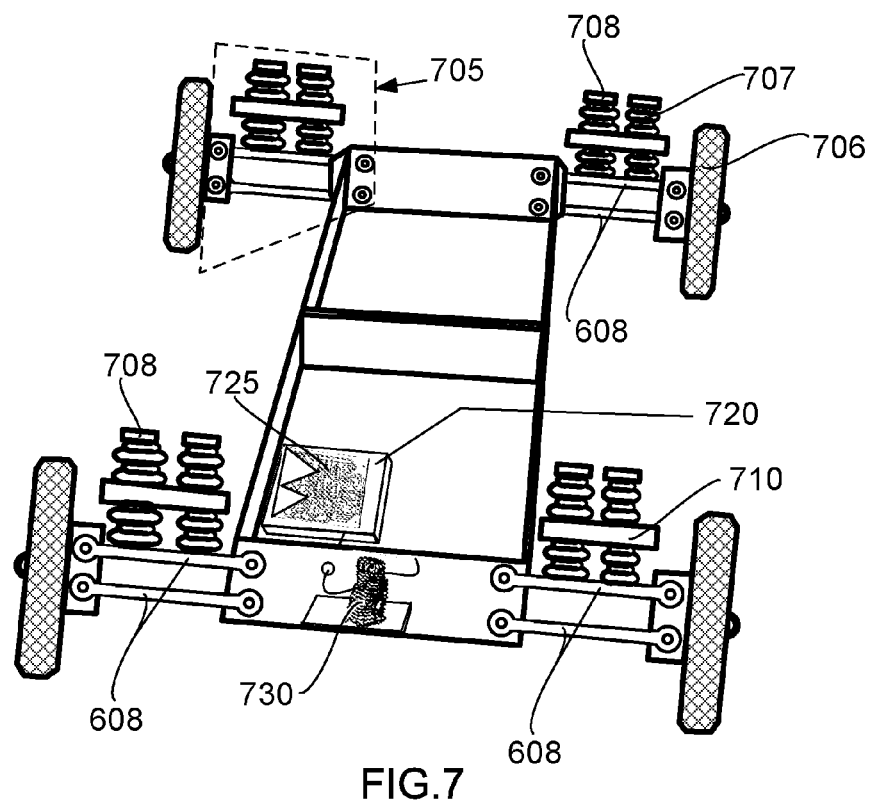
FIG. 7 is a perspective of the suspension system, inflation control system, chassis and wheels.
Figure 8:
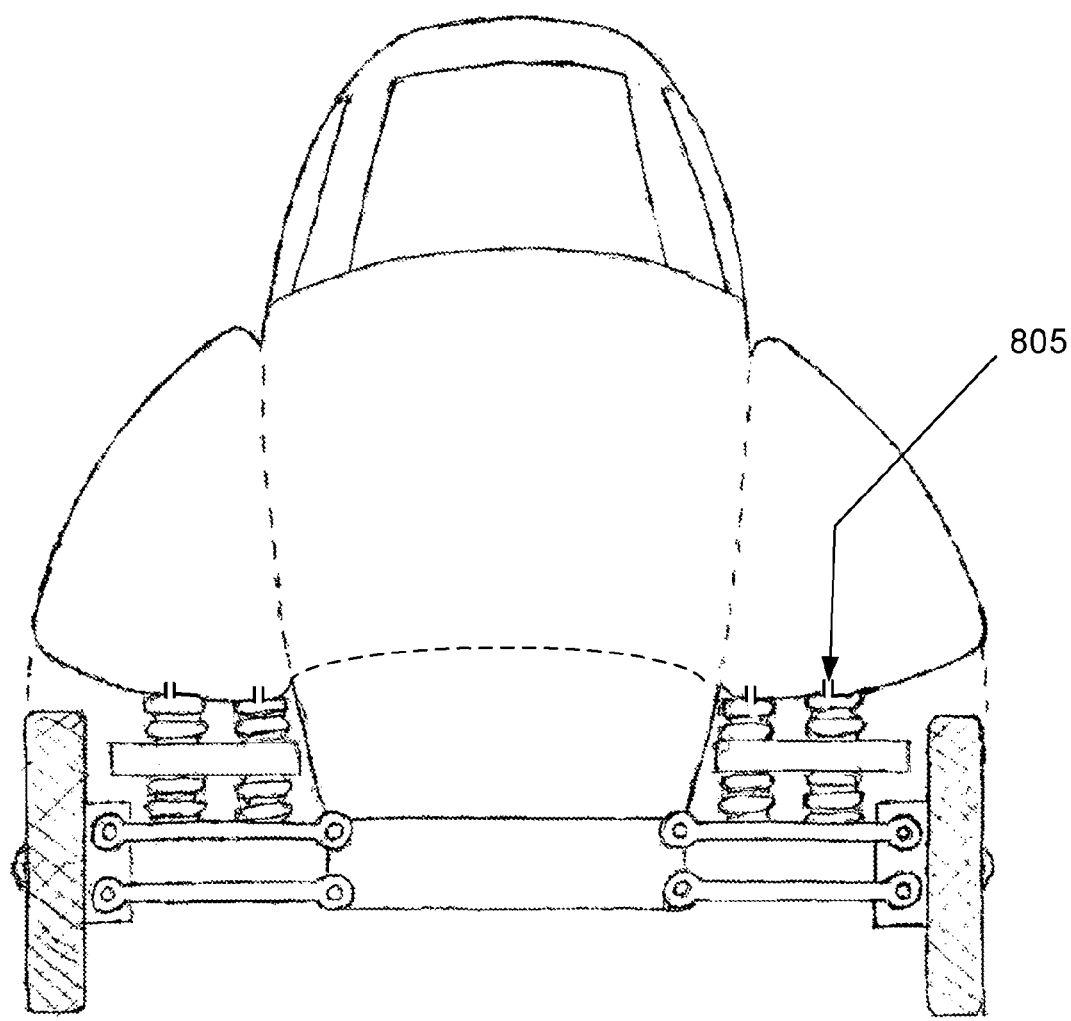
FIG. 8 is a front elevation view of the embodiment of FIG. 1.
Figure 9:
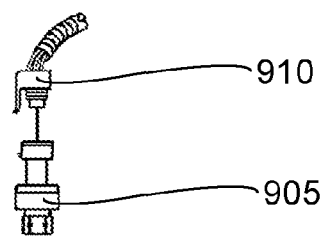
FIG. 9 is a front elevation view of an electromagnetic valve and an air-pressure sensor.
Figure 10:
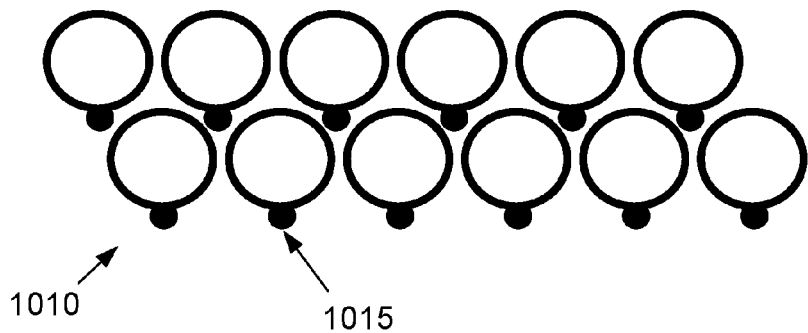
FIG. 10 is a front elevation view of optional scales for the exterior of the inflatable body showing a small point of attachment.
Figure 11:
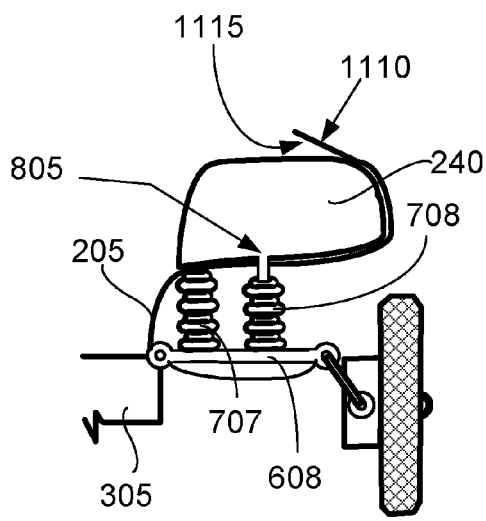
FIG. 11 is an elevation view of the front left side suspension in the context of a wheel and the inflatable body and showing a separate air-spring alongside an air-damper both connected to a chamber in the left-side-front-fender as a source of compressed air.
Figure 12:
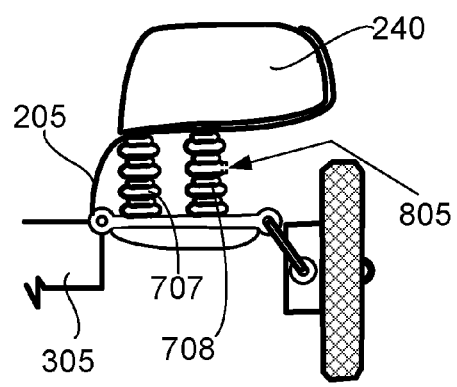
FIG. 12 is the same as FIG. 11, except that the air-damper is flowably connected to the atmosphere.

The electric vehicle (100) preferably includes a suspension system (705), one embodiment of which is shown within the dashed enclosure in FIG. 7, with alternate embodiments shown in FIG. 11 and FIG. 12.

Preferably, there is a suspension system (705) for each wheel (706). The suspension system includes at least a first arm, shown in FIG. 13 as a combination of two parts: the first air-chamber bag (607) and the first sheet-metal cap (608). The first arm comprises, the first air-chamber bag (607) and the first sheet-metal cap (608), where the first air-chamber bag (607) is partially contained by the first sheet-metal cap (608).

While there may be only one first arm connecting the chassis (305) and the wheel (706), as shown in FIG. 7, there may be two first arms connecting the chassis (305) and a wheel (706).

The suspension system (705) may further include a second arm of a different design than the first arm. The different design is a wishbone configuration (605) shown in FIG. 6. The second arm is a combination of four parts: the first air-chamber bag (607), the first sheet-metal cap (608), a second air-chamber bag (609) and a second sheet-metal cap (610). The combination of the first air-chamber bag (607 with the first sheet-metal cap (608) is oriented in the shape of a V with respect to the combination of the second air-chamber bag (609) and the second sheet-metal cap (610).

The first arm and the second arm are preferably attached to a tubular bearing (606) at each end of the sheet metal caps comprising each such arm. The two ends of the first arm are shown in FIG. 13 at a north arrow (611) and a south arrow (612).

Figure 6:
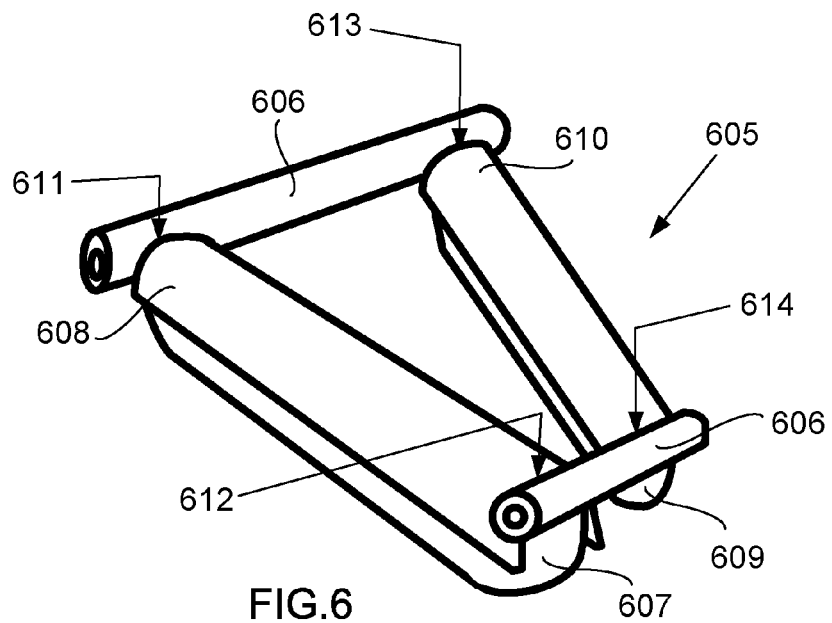
FIG. 6 is a perspective view of one of eight arms in a wishbone configuration in the suspension system of a preferred embodiment of the inflatable electric vehicle.

The two ends of the second arm are formed by four points shown in FIG. 6, which are the north arrow (611) together with the northeast arrow (613) forming one end; and the south arrow (612) together with the southeast arrow (614) forming the other end. FIG. 6 shows the tubular bearing (606) at each end of the wishbone configuration (605). FIG. 13 shows the tubular bearing (606) at each end of the first sheet-metal cap (608) of the first arm. Each tubular bearing (606) permits rotation of the arms and the wheel (706) for storage within one of the two box-like structures (410) when the inflatable body is deflated.

When the first arm is utilized, each tubular bearing (606) at each end of the first arm is configured to rotate the wheel (706), while the wheel (706) is attached to the chassis (305), into storage within one of the two box-like structures (410) when the inflatable body (205) is deflated.

Similarly, when the second arm is utilized, the wishbone configuration (605) includes two ends as described above. Each tubular bearing at each end of the wishbone configuration (605) is each configured to rotate the wheel (706), while the wheel (706) is attached to the chassis (305), into storage within one of the two box-like structures (410) when the inflatable body (205) is deflated.

Whether the first arm or the second arm is used, each would be similarly connected between the chassis (305) and the wheel (706). And, either may be used as a single arm between the chassis (305) and the wheel (706), as shown in FIG. 14, or two arms between the chassis (305) and the wheel (706), as shown in FIG. 7.

The first air-chamber bag (607) and the second air-chamber bag (609) are partially contained by the first sheet-metal cap (608) and the second sheet-metal cap (610), respectively. Each such sheet-metal cap may be needed because the arms of the suspension system are preferably rigid when in use. In order to provide the "rigidness" when inflated, and "flexibility" when deflated for packing away, the arms may be covered by a structural enhancement, or hard sheet (such as sheet metal), which is bendable when it lays flat, yet becomes rigid when it is bent by the natural curved-shape of one of the inflated air-chamber bags. This is illustrated in FIG. 15 showing bent configuration (1505) to the sheet-metal cap. Such a structural enhancement may be used at other critical support locations as is deemed appropriate.

The suspension system (705) may include an air-spring (707) that is a sealed bellows filled with compressed-air. In addition the suspension system (705) may include an air-damper (708), which is a bellows that defines a vent hole (805), the vent hole flowably connecting to one of the external atmosphere (as shown in FIG. 12) and the compressed-air source, which for example, may be one of the left-side-front-fender (240) shown in FIG. 11, the right-side-front-fender (230), the right-side-rear-fender (235), and the left-side-rear-fender (245). The external atmosphere is the air at a pressure and temperature present in the atmosphere external to the inflatable body (205).

Thus, the suspension system (705) is preferably a multi-point and multi-stage independent suspension system that includes multiple supporting points, for example a supporting point provided by each air-spring (707) and each air-damper (708) for each wheel (706). A multi-stage suspension may also be created by adding one or more weights, such as a battery pack (710) between each sheet metal cap and the inflatable body (205), preferably connected by the air-spring (707) and air-damper (708).

The first arm and/or the second arm may be mounted to the chassis (305) using a suspension arm axis (330), a second axis (1405), and/or such other connection permitting rotation. FIG. 14 illustrates three such axes of rotation.

Each suspension system (705) preferably includes an air-spring (707). Each suspension system (705) preferably further includes an air-damper (708) that operates by regulating the air pressure in the bellows using the fenders as reservoirs. Thus, for this embodiment, the plurality of chambers (105) further includes a right-side-front-fender (230), a right-side-rear-fender (235), a left-side-front-fender (240), and a left-side-rear-fender (245). For this embodiment, an air-damper (708) sits atop the arm of the suspension system (705). Alternatively the air-damper (708) may be inside of the air-spring (707). Each air-damper (708) defines a vent hole (805) flowably connected to one of the right-side-front-fender (230), the right-side-rear-fender (235), the left-side-front-fender (240), and the left-side-rear-fender (245).

The electric vehicle (100) is preferably carrying a battery pack (710) for each wheel located between each sheet-metal cap and the inflatable body (205). Each wheel (706), thus, preferably has a multi-stage suspension.

The electric vehicle (100) preferably includes an inflation control system (720). The inflation control system (720) includes an electronic control unit (725), which is essentially an onboard computer that is programmable to control and maintain the pressurization of the inflatable body (205) and the plurality of chambers (105). The inflation control system (720) is preferably configured to inflate and deflate the inflatable body (205) and each chamber in the plurality of chambers (105).

The inflation control system (720) includes an air pump (730) electrically connected to the electronic control unit (725). The air pump (730) is preferably automatically controlled to turn on and off as needed.

The inflation control system (720) includes a plurality of electromagnetic valves, wherein each electromagnetic valve (905) in the plurality of electromagnetic valves is connected to the inflatable body (205) and to each chamber in the plurality of chambers (105). Each electromagnetic valve (905) can be opened or closed by action of the inflation control system (720) for inflation or deflation of the inflatable body (205) or any of the plurality of chambers (105).

The inflation control system (720) includes an air-pressure sensor (910) connected to the electronic control unit (725). Preferably, there is an air-pressure sensor (910) for every air filled component so that the electronic control unit (725) can sense whether or not pressure needs changing within the inflatable body (205) and within each chamber in the plurality of chambers (105).

Thus, the electronic control unit (725) is configured to turn on the air pump (730) and open each of the electromagnetic valves to allow the air pump (730) to pressurize the inflatable body (205) or any of the plurality of chambers (105) to a desired pressure measured by the air-pressure sensor (910).

Preferably, the inflation control system (720) constantly monitors the air pressure within the inflatable body (205) and each chamber in the plurality of chambers (105). For example, if air pressure is below a specified value, the electronic control unit (725) would turn on the air pump (730), open the corresponding electromagnetic valve and allow high pressure air to move into the inflatable body (205) or chamber until the air pressure is recovered. In addition, an air dehumidifier may be used to remove any water vapor from entering the inflation control system (720).

Figure 16:
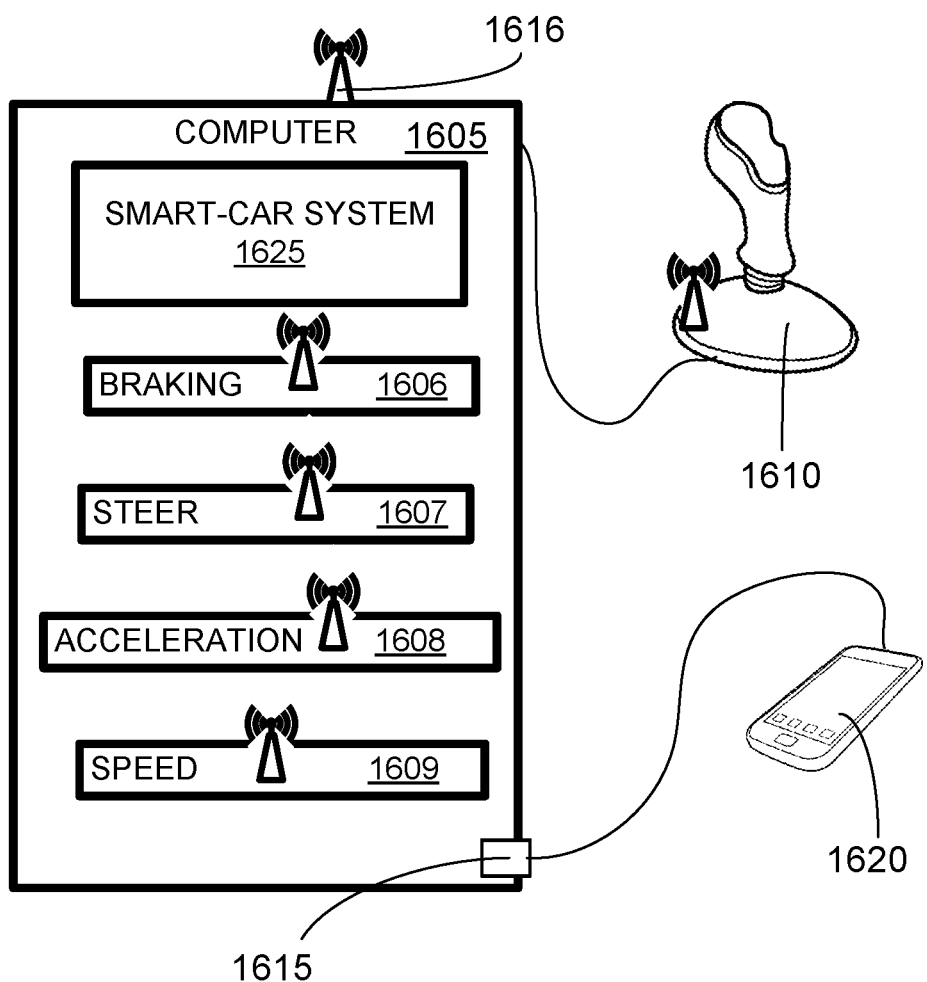
FIG. 16 is a diagram of a computerized driving system for the electric vehicle.

FIG. 16 illustrates a joystick driving-system for the electric vehicle (100) that may include a central control unit or onboard computer (1605) operable by a joystick (1610). The onboard computer (1605) is configured to enable the joystick (1610) to steer (1607) the electric vehicle (100) and control acceleration (1608), speed (1609) and braking (1606) of the electric vehicle (100). The joystick (1610) is operable by a wired or wireless connection to the onboard computer (1605).

The onboard computer (1605) may further include a connecting port (1615) or wireless connection (1616) for a portable computer device (1620), such as a smart phone or tablet PC, having an accelerometer and gravity sensor such that when connected through the connecting port (1615), there is an option to use the portable computer device (1620) to replace or disable the joystick (1610). Some of the functions of onboard computer (1605) may be taken over by this portable computer device. The portable computer device (1620) may also be used to replace a dashboard display.

The electric vehicle (100) preferably also enables "drive by wire" (or wireless network) control system, in which the steering wheel, the acceleration and brake pedals do not mechanically connect to any wheel (706), a motor control box or a brake, but rather operate by electronic signal to activate a respective actuator. There is at least one motor driving at least one wheel (706). The steering wheel, accelerator and bake pedals may also be replaced by a joystick (1610) or other joystick-like control rod, for which tilting left and right, forward and backward corresponding vehicle actions of turning left and right, accelerating and braking. Such a joystick (1610) may also be replaced by a portable computer device with accelerometer and gravity sensor, such as smart phone (1620) and tablet personal computer.

The onboard computer (1605) may include a smart-car system (1625), which generally enables wireless communication devices, onboard non-transitory computer readable storage containing with updatable road maps, Global Positioning System (GPS), collision avoidance software, connections to radar and camera sensors, and various other onboard sensors. Such a smart car system could achieve at least objectives described below.

A first objective is to enable auto driving on a beaconed highway or well-marked highway. A beaconed highway has electronic devices or tags (such as RFID, or barcode), which direct the vehicle to follow the track with certain speed, and inform the distance to an approaching stop sign or traffic light. Aided by collision avoidance sensors, computer-commanded automated driving can be realized.

A second objective is enabling traffic reporting and a "smart" navigation system. Each electric vehicle (100) equipped with a smart car system could wirelessly report to a central server on the location and the speed of the electric vehicle (100), which may be done anonymously for privacy reasons. With sufficient data, the central server could inform each similarly-equipped vehicle on the traffic conditions in real time, and in cooperation with the onboard computer, could calculate the best path and make the recommendation to the driver or auto driving system.

A third objective is providing the driver with a vehicle health monitoring report. This might be supplemented with comprehensive internal sensors that constantly transmit data to the onboard computer with analysis software, enable the computer fully assess the total operating condition of the vehicle and reminds the owner of the need for maintenance or other precautionary actions.

Temperature control and air conditioning (AC) system for the driver's compartment (110) may be included. The driver's compartment (110) can be maintained at a comfortable temperature with an AC system, and energy saving may be achieved with the good insulation provided by thick coating provided by the plurality of chambers (105) and inflated "double-layer" windows of clear plastic. A heat pump of the AC system can be compressor based, or based on the thermoelectric effect (or Peltier-Seebeck effect) based. When present, the heat pump could also be used for drying the air entering the inflatable body (205) or any of the plurality of chambers (105).

The above-described embodiments including the drawings are examples of the invention and merely provide illustrations of the invention. Other embodiments will be obvious to those skilled in the art. Thus, the scope of the invention is determined by the appended claims and their legal equivalents rather than by the examples given.

INDUSTRIAL APPLICABILITY

The invention has application to the automobile industry.

What is claimed is:

1. An electric vehicle for personal transportation, the electric vehicle comprising:
   an electric motor configured to drive a wheel of the electric vehicle;
   an inflatable body that is airtight; and
   a chassis, the chassis comprising two box-like structures, wherein each of the two box-like structures comprises a floor connecting at least 2 walls rising from the floor, the two box-like structures connected together with one or more hinges so that when rotated together around said one or more hinges the two box-like structures form an enclosure configured to hold the inflatable body when the inflatable body is deflated.

2. The electric vehicle of claim 1, wherein
   the inflatable body comprises a plurality of chambers which are positioned within the inflatable body, wherein each chamber in the plurality of chambers is an independent airtight container; and
   the plurality of chambers is shaped to define structural components selected from group consisting of a driver's compartment for the electric vehicle, a driver's seat within the driver's compartment; a right-side-front-fender, a right-side-rear-fender, a left-side-front-fender, a left-side-rear-fender, a rooftop, and a driver's-air-bag positioned in front of the driver's seat.

3. The electric vehicle of claim 2, wherein the inflatable body further comprises a front-end, the front-end comprising a front-chamber; and wherein a front-chamber is configured to inflate a driver's-air-bag through a flowable connection when the front-chamber is impacted in a front-end collision.

4. The electric vehicle of claim 2,
wherein the plurality of chambers comprises a left-side-door-chamber; and
wherein the left-side-door-chamber opens when deflated and closes when inflated.

5. The electric vehicle of claim 2,
wherein the plurality of chambers comprises a roof-top-chamber; and
wherein the roof-top-chamber opens when deflated and closes when inflated.

6. The electric vehicle of claim 2, further comprising an inflation control system, the inflation control system comprising:
an electronic control unit;
an air pump electrically connected to the electronic control unit;
a plurality of electromagnetic valves, wherein each electromagnetic valve in the plurality of electromagnetic valves is connected to the inflatable body and to each chamber in the plurality of chambers;
an air-pressure sensor connected to the electronic control unit; and
the electronic control unit configured to turn on the air pump, open each of the electromagnetic valves to allow the air pump to pressurize the inflatable body or any of the plurality of chambers to a desired pressure measured by the air-pressure sensor.

7. The electric vehicle of claim 1, wherein the inflatable body comprises an inside surface and an outside surface, wherein the outside surface is covered by a plurality of scales that are independently-affixed to the outside surface.

8. The electric vehicle of claim 1, wherein one or two of the two box-like structures comprises a plurality of telescoping sections that slide together to shorten the chassis and that slide apart to lengthen the chassis.

9. The electric vehicle of claim 1, further comprising a suspension system, the suspension system comprising a first arm connected between the chassis and a wheel, the first arm comprising a first air-chamber bag and a first sheet-metal cap, the first air-chamber bag partially contained by the first sheet-metal cap.

10. The electric vehicle of claim 9, the first arm comprising two ends, and the suspension system further comprising a tubular bearing at each end of the first arm, each tubular bearing configured to rotate the wheel, while the wheel is attached to the chassis, into storage within one of the two box-like structures when the inflatable body is deflated.

11. The electric vehicle of claim 1, further comprising a suspension system, the suspension system comprising a second arm having a wishbone configuration and connected between the chassis and a wheel, wherein:
the second arm comprises:
a first sheet-metal cap;
a first air-chamber bag partially contained by the first sheet-metal cap;
a second sheet-metal cap; and
a second air-chamber bag; partially contained by a second sheet-metal cap.

12. The electric vehicle of claim 11, the wishbone configuration comprising two ends, and the suspension system further comprising a tubular bearing at each end of the wishbone configuration, each tubular bearing configured to rotate the wheel, while the wheel is attached to the chassis, into storage within one of the two box-like structures when the inflatable body is deflated.

13. The electric vehicle of claim 10, wherein the suspension system further comprises a battery pack for the wheel located between each sheet-metal cap and the inflatable body.

14. The electric vehicle of claim 1, further comprising a suspension system, the suspension system comprising:
an air-spring that is a sealed bellows filled with compressed-air; and
an air-damper comprising a bellows, the bellows defining a vent hole, the vent hole flowably connecting to one of the external atmosphere and the compressed-air source.

15. The electric vehicle of claim 1, further comprising: an onboard computer operable by a joystick, the onboard computer configured to enable the joystick to steer the electric vehicle, and control acceleration, speed and braking of the electric vehicle, the joystick operable by a wired or wireless connection to the onboard computer.

16. The electric vehicle of claim 14, further comprising a connecting port for a portable computing device having an accelerometer and gravity sensor such that when connected through the connecting port, the portable computing device disables the joystick.

* * * * *